United States Patent
Sakimura et al.

(10) Patent No.: US 10,266,666 B2
(45) Date of Patent: *Apr. 23, 2019

(54) POROUS RESIN PARTICLE AND METHOD FOR PRODUCING THE SAME, AND STRUCTURE

(71) Applicant: Konica Minolta, Inc., Tokyo (JP)

(72) Inventors: Tomoo Sakimura, Hino (JP); Shingo Fujimoto, Fussa (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/335,013

(22) Filed: Oct. 26, 2016

(65) Prior Publication Data

US 2017/0121484 A1 May 4, 2017

(30) Foreign Application Priority Data

Oct. 30, 2015 (JP) .................................. 2015-214105

(51) Int. Cl.
| | |
|---|---|
| C08J 9/16 | (2006.01) |
| C08J 9/20 | (2006.01) |
| C08J 3/12 | (2006.01) |
| C08J 9/28 | (2006.01) |
| C09D 5/16 | (2006.01) |
| C08F 212/08 | (2006.01) |
| C08F 212/36 | (2006.01) |
| C09D 7/40 | (2018.01) |
| C08K 7/22 | (2006.01) |

(52) U.S. Cl.
CPC ............. *C08J 9/286* (2013.01); *C08F 212/08* (2013.01); *C08F 212/36* (2013.01); *C09D 5/1681* (2013.01); *C09D 7/69* (2018.01); *C09D 7/70* (2018.01); *C08J 2201/0544* (2013.01); *C08J 2205/042* (2013.01); *C08J 2325/02* (2013.01); *C08J 2325/08* (2013.01); *C08K 7/22* (2013.01)

(58) Field of Classification Search
CPC .................. C08J 9/16; C08J 9/20; C08J 3/12
See application file for complete search history.

(56) References Cited

U.S. PATENT DOCUMENTS

| | | | | |
|---|---|---|---|---|
| 5,238,992 A | * | 8/1993 | Outubuddin | B01D 67/0006 524/710 |
| 6,046,246 A | * | 4/2000 | Lowe | B01D 15/1807 210/634 |
| 2009/0186093 A1 | * | 7/2009 | Liu | A61K 9/5026 424/497 |
| 2012/0273404 A1 | * | 11/2012 | Wyndham | B01J 20/286 210/198.2 |
| 2014/0148560 A1 | * | 5/2014 | Qureshi | C08G 8/22 525/472 |

FOREIGN PATENT DOCUMENTS

| | | |
|---|---|---|
| JP | 3158186 B2 | 4/2001 |
| JP | 2005-344066 A | 12/2005 |
| JP | 2010-520354 A1 | 6/2010 |
| JP | 5311017 B2 | 7/2013 |
| JP | 2013-227535 A | 11/2013 |
| JP | 2014029476 A | 2/2014 |
| WO | 2010007956 A1 | 1/2010 |

OTHER PUBLICATIONS

Definition of "Integral." Merriam Webster. (Year: 2017).*
Definition of Protective Colloid. Wiley Online Library. John Wiley & Sons. Mar. 15, 2007. (Year: 2007).*
Notice of Reasons for Rejection dated Dec. 5, 2017 from corresponding Japanese Patent Application No. JP 2015-214105 and English translation.
Decision of Rejection dated Jul. 3, 2018 from corresponding Japanese Patent Application No. JP 2015-214105 and English translation.

* cited by examiner

*Primary Examiner* — Kara B Boyle
(74) *Attorney, Agent, or Firm* — Lucas & Mercanti, LLP

(57) ABSTRACT

A method for producing a porous resin particle including a mesoporous structure portion and an outer shell portion integrally formed on a surface of the mesoporous structure portion includes, in a state that an oil-phase liquid, in which a polymerizable monomer and an oil-soluble polymerization initiator having a polymerization initiating ability to the polymerizable monomer are dissolved or dispersed in a hydrophobic solvent, is dispersed as oil droplets in an aqueous medium containing a water-soluble polymerization initiator having a polymerization initiating ability to the polymerizable monomer, generating a plurality of mesopores inside the porous resin particle by forming a solid medium, by polymerizing the polymerizable monomer by acting the oil-soluble polymerization initiator and the water-soluble polymerization initiator at the same time on the polymerizable monomer.

4 Claims, 2 Drawing Sheets

POROUS RESIN PARTICLE AND METHOD FOR PRODUCING THE SAME, AND STRUCTURE

The entire disclosure of Japanese Patent Application No. 2015-214105 filed on Oct. 30, 2015 including description, claims, drawings, and abstract are incorporated herein by reference in its entirety.

BACKGROUND OF THE INVENTION

Field of the Invention

The present invention relates to a porous resin particle inside which multiple spaces are formed, a method for producing the same, and a structure.

Description of the Related Art

In various fields, a structure having a water-repellent surface is used for the purpose of antifouling and the like, and a structure capable of sustaining higher water repellency is required. The term "higher water repellency" refers to, for example, having a pure water contact angle exceeding 120 degrees. Such high water repellency is difficult to achieve only by containing a silicone component or a fluorine resin on a surface of the structure.

As a specific measure for obtaining such high water repellency, for example, it has been proposed to form nano-sized irregularities resembling a lotus leaf on a surface of a structure.

For example, in order to obtain high water repellency, nano-sized irregularities are formed on a surface by, for example, adequately aggregating fine particles (see JP 2014-29476 A, WO 10/007956, and JP 5311017 B2).

However, because such an irregular structure is formed only on the surface, there is a drawback that high water repellency is exerted only on the surface, and the water repellency is lowered when the surface is worn away.

SUMMARY OF THE INVENTION

The present invention has been made in view of the above situation, and an object of the present invention is to provide a porous resin particle capable of maintaining high water repellency even when worn away and a method for producing the same, and a structure containing the porous resin particle.

To achieve the abovementioned object, according to an aspect, a porous resin particle reflecting one aspect of the present invention comprises a plurality of mesopores inside a polymer.

The porous resin particle preferably comprises a mesoporous structure portion in which a plurality of mesopores is formed inside a solid medium comprising a polymer.

The porous resin particle preferably comprises the mesoporous structure portion, and an outer shell portion integrally formed on a surface of the mesoporous structure portion.

To achieve the abovementioned object, according to an aspect, a structure reflecting one aspect of the present invention comprises the porous resin particle dispersed in a base material.

To achieve the abovementioned object, according to an aspect, there is provided a method for producing a porous resin particle comprising a mesoporous structure portion and an outer shell portion integrally formed on a surface of the mesoporous structure portion, and the method reflecting one aspect of the present invention comprises, in a state that an oil-phase liquid, in which a polymerizable monomer and an oil-soluble polymerization initiator having a polymerization initiating ability to the polymerizable monomer are dissolved or dispersed in a hydrophobic solvent, is dispersed as oil droplets in an aqueous medium containing a water-soluble polymerization initiator having a polymerization initiating ability to the polymerizable monomer, generating a plurality of mesopores inside the porous resin particle by forming a solid medium, by polymerizing the polymerizable monomer by acting the oil-soluble polymerization initiator and the water-soluble polymerization initiator at the same time on the polymerizable monomer.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1:
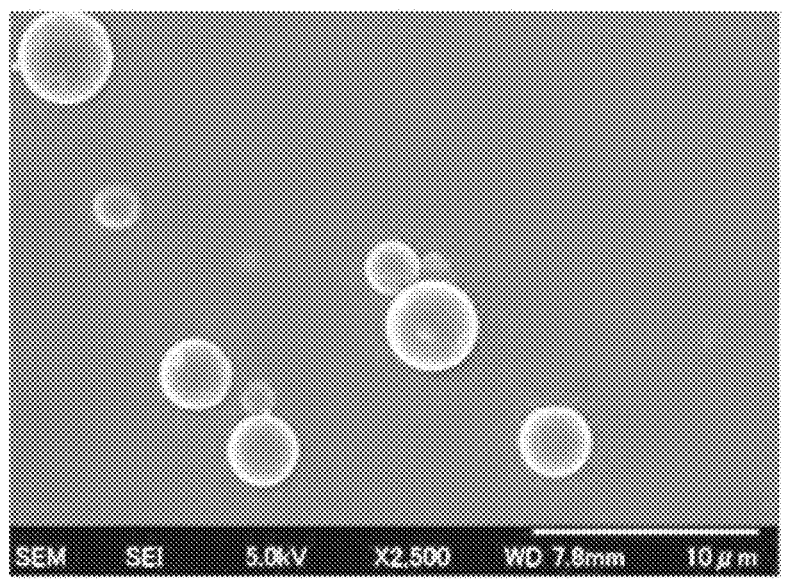
FIG. 1 is a SEM photograph showing a surface of a porous resin particle according to an embodiment of the present invention.

Hereinafter, an embodiment of the present invention will be described in detail with reference to the drawings. However, the scope of the invention is not limited to the illustrated examples.

[Porous Resin Particle]

A porous resin particle according to an embodiment of the present invention has multiple mesopores inside a solid medium including a polymer, and can be constituted by having a mesoporous structure portion in which a mesoporous structure is formed by the multiple mesopores. Alternatively, the porous resin particle can be constituted by including a mesoporous structure portion, and an outer shell portion integrally formed on a surface of the mesoporous structure portion.

In the porous resin particle according to an embodiment of the present invention, specifically, an outer shell portion which is exposed to a surface, and a resin wall portion which is not exposed to the surface and partitions multiple mesopores are integrally formed as a solid medium, and a mesoporous structure portion includes the multiple mesopores and the resin wall portion partitioning the mesopores. Inside of the mesopores surrounded by the outer shell portion and the resin wall portion is usually filled with air.

The cross-sectional structure of the inside of a porous resin particle can be confirmed, for example, with the observation by a known measure such as observing, with a scanning electron microscope (SEM), the cross-section obtained by embedding a porous resin particle in a UV curing resin and immersing the particle-embedded UV curing resin in a liquid nitrogen, or observing the section with a transmission electron microscope (TEM).

In the present invention, mesopores means pores each of which has a diameter of 2 to 50 nm, and appears as a white spot when an ultrathin section having a thickness of 50 nm cut out by an ultramicrotome from a sample obtained by embedding a porous resin particle in a photocurable resin is observed with a transmission electron microscope (TEM).

Furthermore, the mesoporous structure means a porous structure including mesopores, and means in the present invention a structure in which (1) the hollowness, which is described later, is 30% by volume or more, and (2) the number of the mesopores that satisfy the above condition is 50% by number or more in 100 white spots randomly selected.

The number of the mesopores that satisfy the above conditions is preferably 80% by number or more, and more preferably 90% by number or more in a porous resin particle.

The outer shell portion in a porous resin particle may be not only the form formed on the entire surface of the mesoporous structure portion but also the form formed on a part of the surface of the mesoporous structure portion.

[Solid Medium Resin]

The resin constituting a solid medium including an outer shell portion and a resin wall portion (hereinafter, also referred to as "solid medium resin") includes, for example, a polymer obtained by polymerizing a polymerizable monomer.

Examples of the solid medium resin include a styrene resin, an acrylic resin, a vinyl chloride resin, and a styrene-acrylic resin. Furthermore, the solid medium resin preferably contains a crosslinking structure.

[Average Particle Diameter of Porous Resin Particle]

The average particle diameter of a porous resin particle according to an embodiment of the present invention can be set to, for example, 0.01 to 200 μm in volume median diameter. The particle diameter can be controlled by the adjustment of the size of an oil droplet in the production method described later.

The volume median diameter of a porous resin particle can be measured by using "LA-750" (manufactured by HORIBA Ltd.). For example, specifically, the volume median diameter can be measured by using, as a sample, a dispersion obtained by adding 0.2 g of porous resin particles into 20 ml of an aqueous surfactant solution (for example, an aqueous surfactant solution obtained by diluting a neutral detergent containing a surfactant component with pure water by 10 times for the purpose of dispersing porous resin particles), and by subjecting the resultant mixture to ultrasonic dispersion for 3 minutes.

[Hollowness of Porous Resin Particle]

The hollowness of a porous resin particle is preferably 30% by volume or more, more preferably 50% by volume or more, and further preferably 60% by volume or more.

The hollowness of a porous resin particle can be controlled by the adjustment of the content ratio of a hydrophobic solvent to an oil-phase liquid described later.

The hollowness of a porous resin particle is measured as follows.

That is, first, 10.0 g of porous resin particles is added into a mixture of 2.4 g (in terms of solid content) of aqueous urethane emulsion "WBR-016U" (manufactured by Taisei Fine Chemical Co., Ltd.) and 2.0 g of pure water, and the resultant mixture is dispersed by a rotation and revolution type mixer "ARE-310" (manufactured by THINKY CORPORATION) to obtain a dispersion. This dispersion is filled in a formwork having a width of 80 mm, a length of 120 mm, and a thickness of 2 mm, dried at room temperature, then heated and dried to be solidified, and then the resultant product is taken out from the formwork, whereby a sample plate is prepared. Furthermore, by measuring the volume and mass of the sample plate with a densimeter "DME-220H" (manufactured by SHINKO DENSHI CO., LTD.), the hollowness of a porous resin particle can be calculated in accordance with the following equation (1).

$$\text{hollowness (\% by volume)} = \{\text{volume of the internal space of a porous resin particle/whole volume of the porous resin particle}\} \times 100 \quad \text{Equation (1):}$$

Herein, the volume of the internal space of a porous resin particle=volume of the voids in a sample plate, the whole volume of the porous resin particle=volume of the voids in a sample plate+volume of a solid medium resin of the porous resin particle, and further, the volume of the voids in a sample plate={volume of the sample plate−(volume of the binder resin portion+volume of the solid medium resin of the porous resin particle+volume of water infiltrating the voids between the porous resin particles}, the volume of the binder resin portion={(mass of the binder resin in a sample plate)/(density of the binder resin)}, the mass of the binder resin in a sample plate=mass of the sample plate×0.1935, the density of the binder resin=1.07, the volume of the solid medium resin of the porous resin particle={(mass of the porous resin particle in the sample plate)/(density of the solid medium resin of the porous resin particle)}, the mass of the porous resin particle in the sample plate=mass of the sample plate×0.8065, and the density of the solid medium resin of the porous resin particle is assumed to be 1.05.

The porous resin particle described above can be used as a modifying material for imparting high water repellency to a structure. In addition, for example, the porous resin particle can be used as a heat insulating material, a weight reducing material, or a soundproof material, and further can also be used as a function member for imparting whiteness and the like due to the light diffusion property and concealing property by utilizing the fact that scattering of visible light is generated by a difference in refractive index between the solid medium and the internal space. When using a porous resin particle for these applications, a surface treatment can be performed on the prepared porous resin particle as needed. For example, by introducing a fluorinated alkyl group onto a surface of the porous resin particle with thiol-ene click reaction, the oil repellency on the surface of the porous resin particle can be improved, and further, for example, by performing an ozone treatment on a surface of the porous resin particle, the surface of the porous resin particle is hydrophilized and the dispersibility can be changed.

According to the porous resin particle described above, because the porous resin particle has multiple mesopores inside thereof, a nano-sized irregular structure is present also on a surface that appears when worn away, as a result of which the high water repellency can be maintained continuously.

[Method for Producing Porous Resin Particle]

The method for producing a porous resin particle according to an embodiment of the present invention is a method for producing a porous resin particle including a mesoporous structure portion and an outer shell portion integrally formed on a surface of the mesoporous structure portion, in which an oil-soluble polymerization initiator and a water-soluble polymerization initiator act at the same time on oil droplets in a state that an oil-phase liquid in which a polymerizable monomer and an oil-soluble polymerization initiator having a polymerization initiating ability to the polymerizable monomer are dissolved or dispersed in a hydrophobic solvent is dispersed as the oil droplets in an aqueous medium containing a water-soluble polymerization initiator having a polymerization initiating ability to the polymerizable monomer. According to the method for producing a porous resin particle according to an embodiment of the present invention, a resin wall portion partitioning multiple mesopores is formed by polymerizing a polymerizable monomer by acting an oil-soluble polymerization initiator and a water-soluble polymerization initiator at the same time on the polymerizable monomer in oil droplets, and therefore, a porous resin particle inside which multiple mesopores are formed can be reliably produced.

A specific example of the method for producing a porous resin particle according to an embodiment of the present invention is shown as follows:
(1) an oil-phase liquid preparation process of preparing an oil-phase liquid by dissolving or dispersing a polymerizable monomer for forming a solid medium resin and an oil-soluble polymerization initiator into a hydrophobic solvent,
(2) an oil droplet formation process of forming an oil droplet by dispersing an oil-phase liquid into an aqueous medium obtained by dissolving a water-soluble polymerization initiator and a surfactant,
(3) a polymerization process of forming an outer shell portion and a resin wall portion (solid medium) of a porous resin particle by polymerizing a polymerizable monomer by acting the oil-soluble polymerization initiator and the water-soluble polymerization initiator at the same time on the polymerizable monomer,
(4) a hydrophobic solvent removal process of removing and replacing the hydrophobic solvent filled in the internal spaces of the formed porous resin particle with an aqueous medium,
(5) a washing process of filtering a porous resin particle out of the aqueous medium, and removing a surfactant and the like from the porous resin particle, and
(6) a drying process of drying the washed porous resin particle.

(1) Oil-Phase Liquid Preparation Process

An oil-phase liquid is prepared by dissolving or dispersing a polymerizable monomer for forming a solid medium resin in a hydrophobic solvent, and further adding an oil-soluble polymerization initiator into the resultant mixture.

[Hydrophobic Solvent]

As the hydrophobic solvent, any hydrophobic solvent can be used as long as it has extremely low solubility in water, and therefore can form oil droplets in an aqueous medium, and further has a boiling point higher than the polymerization temperature of a polymerizable monomer for forming a solid medium resin, and for example, a hydrocarbon compound such as cyclohexane, cycloheptane, and hexane; or a chlorohydrocarbon compound such as dichloromethane can be used. These can be used alone or in combination of two or more kinds.

Furthermore, as the hydrophobic solvent, from the viewpoint that the hydrophobic solvent can be easily removed in a hydrophobic solvent removal process, a hydrophobic solvent having a boiling point lower than that of the aqueous medium is preferably used. In a case where, for example, water is used as an aqueous medium, a hydrophobic solvent having a boiling point lower than that of the water, for example, a boiling point of 40 to 90° C. is preferably used.

Furthermore, by adding a component that dissolves or disperses into a hydrophobic solvent, the component can be encapsulated in a porous resin particle, and a surface treatment for mesopores inside the porous resin particle can be performed.

As the polymerizable monomer for forming a solid medium resin, for example, in a case where a vinyl resin is used as the solid medium resin, the polymerizable monomer to form a solid medium resin includes the following.

<1> Styrene-Based Monomer

The styrene-based monomer includes styrene, o-methyl styrene, m-methyl styrene, p-methyl styrene, α-methyl styrene, p-phenyl styrene, p-ethyl styrene, p-n-butyl styrene, p-tert-butyl styrene, p-n-hexyl styrene, p-n-octyl styrene, p-n-nonyl styrene, p-n-decyl styrene, p-n-dodecyl styrene, 2,4-dimethyl styrene, and the like.

<2> (Meth)Acrylic Acid Ester-Based Monomer

The (meth)acrylic acid ester-based monomer includes methyl acrylate, ethyl acrylate, n-propyl acrylate, isopropyl acrylate, n-butyl acrylate, isobutyl acrylate, t-butyl acrylate, n-octyl acrylate, 2-ethylhexyl acrylate, stearyl acrylate, lauryl acrylate, phenyl acrylate, methyl methacrylate, ethyl methacrylate, n-propyl methacrylate, isopropyl methacrylate, n-butyl methacrylate, isobutyl methacrylate, t-butyl methacrylate, n-octyl methacrylate, 2-ethylhexyl methacrylate, stearyl methacrylate, lauryl methacrylate, phenyl methacrylate, diethylaminoethyl methacrylate, dimethylaminoethyl methacrylate, and the like.

<3> Olefins

The olefins include ethylene, propylene, isobutylene, and the like.

<4> Vinyl Esters

The vinyl esters include vinyl propionate, vinyl acetate, vinyl benzoate, and the like.

<5> Vinyl Ethers

The vinyl ethers include vinylmethyl ether, vinylethyl ether, and the like.

<6> Vinyl Ketones

The vinyl ketones include vinylmethyl ketone, vinylethyl ketone, vinylhexyl ketone, and the like.

<7> N-Vinyl Compounds

The N-vinyl compounds include N-vinyl carbazole, N-vinyl indole, N-vinyl pyrrolidone, and the like.

<8> Others

Others include vinyl compounds such as butadiene, vinyl naphthalene, and vinyl pyridine, acrylic acid or a methacrylic acid derivative such as acrylonitrile, methacrylonitrile, acrylamide, and methacrylamide, and maleic anhydride, and the like.

As the polymerizable monomer for forming a solid medium resin, the ones described above can be used alone or in combination of two or more kinds; however, in order to obtain a solid medium resin containing a crosslinking structure, a monofunctional polymerizable monomer and a polyfunctional polymerizable monomer are preferably used in combination.

For example, in a case where the solid medium resin is a vinyl resin, together with a monofunctional vinyl monomer such as the above-described styrene-based monomer or (meth)acrylic acid ester-based monomer, the following polyfunctional vinyl monomers are preferably used as the polyfunctional polymerizable monomer.

<9> Polyfunctional Vinyl Monomer

The polyfunctional vinyl monomer includes dimethacrylate and trimethacrylate of tertiary or higher alcohol such as divinylbenzene, ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, neopentyl glycol diacrylate, hexylene glycol dimethacrylate, hexylene glycol diacrylate, pentaerythritol, and trimethylol propane.

By using such a polyfunctional polymerizable monomer, the oil resistance of a porous resin particle can be improved, and fusing of the porous resin particles can be suppressed during the filtration of the aqueous medium.

Furthermore, by using a polymerizable monomer having a fluorinated alkyl group as the polymerizable monomer for forming a solid medium resin, the water repellency of a porous resin particle can be improved, and oil repellency can be imparted to a porous resin particle, and further, by using a polymerizable monomer having a hydrophilic group such as a hydroxyl group and a carboxyl group, underwater oil-repellency can be imparted to a porous resin particle.

The proportion (copolymerization ratio) of polyfunctional polymerizable monomer in the whole polymerizable monomer for forming a solid medium resin is, for example, 0.1 to 99% by mass, and preferably 1 to 80% by mass.

In the oil-phase liquid, the content ratio of the polymerizable monomer for forming a solid medium resin is preferably 1 to 100 parts by mass based on 100 parts by mass of the hydrophobic solvent.

[Oil-Soluble Polymerization Initiator]

As the oil-soluble polymerization initiator, any oil-soluble polymerization initiator can be used as long as it exerts a polymerization initiating ability at a temperature lower than the boiling point of the hydrophobic solvent. For example, an azo-based or diazo-based polymerization initiator such as 2,2'-azobis-(2,4-dimethylvaleronitrile), 2,2'-azobisisobutyronitrile, 1,1'-azobis-(cyclohexane-1-carbonitrile), 2,2'-azobis-4-methoxy-2,4-dimethylvaleronitrile; a peroxide-based polymerization initiator such as benzoyl peroxide, methylethylketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis-(4,4-t-butylperoxycyclohexyl)propane, and tris-(t-butylperoxy)triazine; a polymer initiator having a peroxide in a side chain; or the like can be used.

These oil-soluble polymerization initiators can be used alone or in combination of two or more kinds.

Herein, the use amount of the oil-soluble polymerization initiator is not particularly limited, but is preferably 0.1 to 3.0% by mass based on the whole polymerizable monomer from the viewpoint of improving the polymerization property of the polymerizable monomer, in particular, the forming property of a resin wall portion.

(2) Oil Droplet Formation Process

The oil droplet formation process is performed specifically, for example, by adding an oil-phase liquid containing a polymerizable monomer for forming a solid medium resin into an aqueous medium in which a surfactant having a concentration less than the critical micelle concentration (CMC) is contained and to which a water-soluble polymerization initiator is added, and by applying mechanical energy to form an oil droplet.

Formation of the oil droplet needs to be performed at such a low temperature that radicals are not generated in the oil-soluble polymerization initiator and the water-soluble polymerization initiator, and is preferably performed, for example, at room temperature.

[Aqueous Medium]

In the present invention, the aqueous medium means an aqueous medium containing 50 to 100% by mass of water and 0 to 50% by mass of a water-soluble organic solvent. The water-soluble organic solvent is not limited as long as it does not dissolve the solid medium resin, the polymerizable monomer for forming the solid medium resin, and the oil-soluble polymerization initiator when mixed with water to be the aqueous medium. As the water-soluble organic solvent, methanol, ethanol, isopropanol, butanol, acetone, methyl ethyl ketone, tetrahydrofuran, or the like can be used.

As the aqueous medium, water not containing an organic solvent is preferably used because of being excellent in environmental compatibility and safety.

[Surfactant]

In a case where a surfactant is contained in the aqueous medium, as the surfactant, an anionic surfactant or a nonionic surfactant is preferably used.

Examples of the anionic surfactant include a sulfonate such as sodium dodecylbenzene sulfonate, sodium aryl alkyl polyether sulfonate, 3,3-disulfone diphenyl urea-4,4-diazobis-amino-8-naphthol-6-sulfonic acid sodium salt, ortho-carboxybenzene-azo-dimethylaniline, and 2,2,5,5-tetramethyl-triphenylmethane-4,4-diazo-bis-β-naphthol-6-sulfonic acid sodium salt; a sulfate ester salt such as sodium dodecyl sulfate, sodium tetradecyl sulfate, sodium pentadecyl sulfate, and sodium octyl sulfate; and a fatty acid salt such as sodium oleate, sodium laurate, sodium caprate, sodium caprylate, sodium caproate, potassium stearate, and calcium oleate.

Examples of the nonionic surfactant include polyethylene oxide, polypropylene oxide, a combination of polypropylene oxide, polyethylene oxide and the like, an ester of polyethylene glycol and higher fatty acid, alkylphenol polyethylene oxide, an ester of higher fatty acid and polyethylene glycol, an ester of higher fatty acid and polypropylene oxide, and sorbitan ester.

These surfactants can be used alone or in combination of two or more kinds.

Furthermore, in place of the surfactants described above, a substance having a protective colloid performance such as polyvinyl alcohol and polyvinyl pyrrolidone can be used.

[Water-Soluble Polymerization Initiator]

The water-soluble polymerization initiator may be a water-soluble polymerization initiator that can exert a polymerization initiating ability at a temperature lower than the boiling point of the hydrophobic solvent. As the water-soluble polymerization initiator, a persulfate such as potassium persulfate, potassium peroxodisulfate, and ammonium persulfate; azobisaminodipropane acetate, azobiscyanovaleric acid and a salt thereof, hydrogen peroxide, or the like can be used.

These water-soluble polymerization initiators can be used alone or in combination of two or more kinds.

Herein, the use amount of the water-soluble polymerization initiator is not particularly limited, but is preferably 0.1 to 5.0% by mass based on the whole polymerizable monomer from the viewpoint of improving the polymerization property of the polymerizable monomer, in particular, the forming property of an outer shell portion.

Furthermore, the ratio of the use amounts of the oil-soluble polymerization initiator and the water-soluble polymerization initiator is not particularly limited, but from the viewpoint of improving the polymerization property of a polymerizable monomer, in particular, the formation balance between the resin wall portion and the outer shell portion, the ratio of the use amounts of the oil-soluble polymerization initiator and the water-soluble polymerization initiator (ratio of the use amounts of the oil-soluble polymerization initiator:water-soluble polymerization initiator (mass ratio)) is preferably in the range of 1:1 to 5:1.

The use amount of the aqueous medium is preferably 50 to 2,000 parts by mass based on 100 parts by mass of the oil-phase liquid.

By setting the use amount of the aqueous medium within the range above, the oil-phase liquid can be emulsified and dispersed in the aqueous medium with a desired particle diameter.

Examples of the measure of applying mechanical energy include a measure of applying strong stirring or ultrasonic vibration energy by using a homomixer (emulsifying machine), ultrasonic waves, Manton Gaulin, or the like.

The average particle diameter of the oil droplets obtained in the oil droplet formation process is preferably, for example, in the range of 10 nm to several hundred μm in volume median diameter.

(3) Polymerization Process

This process is a process of polymerizing a polymerizable monomer for forming the solid medium resin by acting the oil-soluble polymerization initiator and the water-soluble polymerization initiator at the same time on the polymerizable monomer.

In the present invention, the "acting the oil-soluble polymerization initiator and the water-soluble polymerization initiator at the same time" means that there is an overlapping time zone in the radical generation time zones of the oil-soluble polymerization initiator and the water-soluble polymerization initiator.

In this process, radicals in the oil-soluble polymerization initiator and the water-soluble polymerization initiator are generated by heating the reaction system. At this time, polymerization reaction occurs at multi-points inside the oil droplet and on the surface of the oil droplet. Furthermore, the solid medium and the hydrophobic solvent are made incompatible and separated from each other along with the progress of polymerization reaction, but the aggregation stability between polymers and between solvent molecules is suppressed because the position of the polymer constituting the solid medium is bound onto the surface of the oil droplet. Accordingly, it is considered that a solid medium having spaces that become multiple mesopores filled with a hydrophobic solvent is formed.

An average particle diameter of the porous resin particle in the obtained dispersion of the porous resin particle with the internal spaces filled inside with the hydrophobic solvent is preferably, for example, 10 nm to 200 μm in volume median diameter.

In addition, the volume median diameter is measured by using "LA-750" (manufactured by HORIBA, Ltd).

According to the method for producing a porous resin particle according to an embodiment of the present invention, by polymerizing a polymerizable monomer by acting an oil-soluble polymerization initiator and a water-soluble polymerization initiator at the same time on the polymerizable monomer in an oil droplet, an outer shell portion and a resin wall portion partitioning multiple mesopores are formed, as a result of which a porous resin particle inside which a mesoporous structure portion is formed can be easily produced.

Herein, the polymerization conditions of a polymerizable monomer in the polymerization process is not particularly limited, and can be appropriately selected depending on the melting point or boiling point of the hydrophobic solvent or aqueous medium to be used, the kind or amount of the polymerizable monomer, oil-soluble polymerization initiator, and water-soluble polymerization initiator to be used, and the like. For example, the polymerization temperature can be set to 20 to 90° C., and the polymerization time can be set to 2 to 20 hours. By performing the polymerization under such conditions, the predetermined polymerizable monomer can be efficiently polymerized. Furthermore, before the polymerization reaction, for the purpose of replacing the oxygen, which inhibits the polymerization reaction, with an inert gas such as nitrogen, a treatment of stirring an emulsion containing a polymerizable monomer, an oil-soluble polymerization initiator, a water-soluble polymerization initiator, and the like may be performed, for example, at 10 to 30° C. for around 5 to 60 minutes under introduction of inert gas.

(4) Hydrophobic Solvent Removal Process

This process is a process of removing a hydrophobic solvent filled in the internal spaces of the formed porous resin particle, and replacing the hydrophobic solvent with an aqueous medium. Preferably, the polymerizable monomer is polymerized in an aqueous medium, and then the hydrophobic solvent filled in the spaces is replaced with the aqueous medium, and then the resultant product is dried. Furthermore, the hydrophobic solvent removal process may be performed at the same time as or after the above-described polymerization process.

Removal of the hydrophobic solvent can be performed by stirring the whole dispersion, in which the porous resin particles with the internal spaces filled with the hydrophobic solvent are dispersed in the aqueous medium, under air stream. In addition, the whole dispersion may be heated to a temperature lower than the boiling point of the hydrophobic solvent. Furthermore, the whole dispersion may be stirred under reduced pressure. Herein, the conditions of the removal treatment of the hydrophobic solvent in the hydrophobic solvent removal process is not particularly limited, and can be appropriately selected depending on the amount of the hydrophobic solvent to be used, the solubility to the aqueous medium, the volatility, and the like. For example, the stirring of the dispersion of the porous resin particle can be performed at a temperature of 10 to 30° C. for around 5 to 48 hours. By performing the removal treatment of the hydrophobic solvent under such conditions, the hydrophobic solvent and the aqueous medium are mixed with each other via a solid medium (outer shell portion and resin wall portion), and the hydrophobic solvent is vaporized and discharged outside the porous resin particle, as a result of which the hydrophobic solvent in the internal spaces of the porous resin particle can be efficiently replaced with an aqueous medium.

Furthermore, in a case where a substance capable of performing steam distillation such as toluene is used as a hydrophobic solvent, the hydrophobic solvent may be removed by steam distillation.

As described above, by replacing the hydrophobic solvent filled in the internal spaces of the porous resin particle with an aqueous medium once, a decrease in the strength due to the impregnation of hydrophobic solvent to the solid medium is suppressed. Therefore, even if the porous resin particle has high hollowness, fusing of the porous resin particles can be suppressed during the filtration of the aqueous medium. Furthermore, in a case where the porous resin particles are not fused with each other, the present process can be omitted.

(5) Washing Process

In this process, a solid-liquid separation treatment of separating the dispersion of the porous resin particle into a solid and a liquid is performed, and an adhered substance such as a surfactant is removed from the aggregate of the porous resin particles that are formed by solid-liquid separation and are in the wet state. Representative examples of the solid-liquid separation treatment include a filtration treatment, and as a specific method of the filtration treatment, for example, a centrifugal separation method, a reduced pressure filtration method with use of Nutsche, etc., a filtration method using a filter press, etc., or the like can be used.

(6) Drying Process

In this process, a dry treatment of the washed porous resin particle is performed. Examples of the dryer that can be used in this process include a known drying treatment machine such as a spray dryer, a vacuum freezing dryer and a reduced-pressure dryer, a stationary shelf dryer, a movable shelf dryer, a fluidized-bed dryer, a rotary dryer, and a stirring-type dryer. The water content of the dried porous resin particle is preferably 5% by mass or less, and more preferably 2% by mass or less.

Furthermore, in a case where the dried porous resin particles form an aggregate with weak attraction force between particles, the aggregate is preferably subjected to a crushing treatment. Specific examples of the crushing treatment device include a mechanical crushing treatment device such as a jet mill, a Henschel Mixer, a coffee mill, and a food processor.

According to the method for producing a porous resin particle according to an embodiment of the present invention, the above-described porous resin particle can be reliably produced.

Furthermore, as long as the method for producing a porous resin particle is characterized in that a solid medium is formed by polymerizing a polymerizable monomer by acting an oil-soluble polymerization initiator and a water-soluble polymerization initiator at the same time on the polymerizable monomer, the above-described porous resin particle can be produced. For example, the above-described porous resin particle may be produced by adequately reducing the use amount of the hydrophobic solvent relating to the present invention, and by heating to the boiling point or more of the hydrophobic solvent and vaporizing and foaming during or after polymerization.

[Structure]

The structure according to an embodiment of the present invention is obtained by dispersing the above-described porous resin particles into a base material.

As the content ratio of the porous resin particle in the structure, any content ratio can be used as long as it is around the ratio at which expected water repellency is obtained on the structure, for example, 10 to 99.9% by volume is preferred, and 20 to 99% by volume is more preferred.

The base material constituting the structure may be a base material having an affinity for the porous resin particle. For example, a urethane resin, an acrylic resin, polystyrene, polycarbonate, polyester, polyvinyl alcohol, a silicone resin, or a fluorine resin can be used.

The shape of the structure is not particularly limited, but can be set to, for example, a coating film shape, a plate shape, or a block shape.

As the method for preparing the structure, for example, a structure having a coating film shape can be prepared as follows. The porous resin particles are dispersed in a solution in which a base material is dissolved in an appropriate solvent or the like to obtain a coating liquid, and the coating liquid is coated on an appropriate substrate and dried.

Although the embodiments of the present invention have been specifically described above, the embodiments of the present invention are not limited to the examples above, but various changes can be applied.

EXAMPLES

Hereinafter, specific examples of the present invention are described; however, the present invention is not limited to these examples. Unless otherwise noted, each operation is performed at room temperature (25° C.)

Production Example 1 of Porous Resin Particle

Into 25 parts by mass of styrene, 32 parts by mass of divinylbenzene, and 58 parts by mass of cyclohexane, 0.61 parts by mass of an oil-soluble polymerization initiator "V-65" (manufactured by Wako Pure Chemical Industries, Ltd.) were added and dissolved. Into this solution, 420 parts by mass of an aqueous solution of 0.12% by mass sodium lauryl sulfate was added, and the resultant mixture was dispersed at 10000 rpm for 6 minutes with an emulsifying and dispersing machine "CLEARMIX" (manufactured by M Technique Co., Ltd.) to prepare an emulsion dispersion.

This emulsion dispersion was put into a separable flask equipped with a stirrer, a reflux condenser, and a nitrogen inlet, and 0.84 parts by mass of a water-soluble polymerization initiator "VA-57" (manufactured by Wako Pure Chemical Industries, Ltd.) were added into the flask and dissolved, and then the resultant mixture was subjected to a polymerization reaction while stirring, by introducing a nitrogen stream, then raising the temperature, and heating and stirring for 8 hours while maintaining the polymerization temperature at 60° C., as a result of which a porous resin particle was formed.

Thereafter, the formed porous resin particle was recovered by suction filtration, and washed with ion exchange water, and then spread on a tray and dried at 40° C. to obtain a white porous resin particle [1].

When the volume median diameter of the porous resin particle [1] was measured by using a laser diffraction/scattering type particle size distribution measuring device "LA-750" (manufactured by HORIBA Ltd.), the volume median diameter was 1.60 μm.

Furthermore, when the hollowness of the porous resin particle [1] was measured in a similar manner to that described above, the hollowness was 65% by volume.

Figure 2:
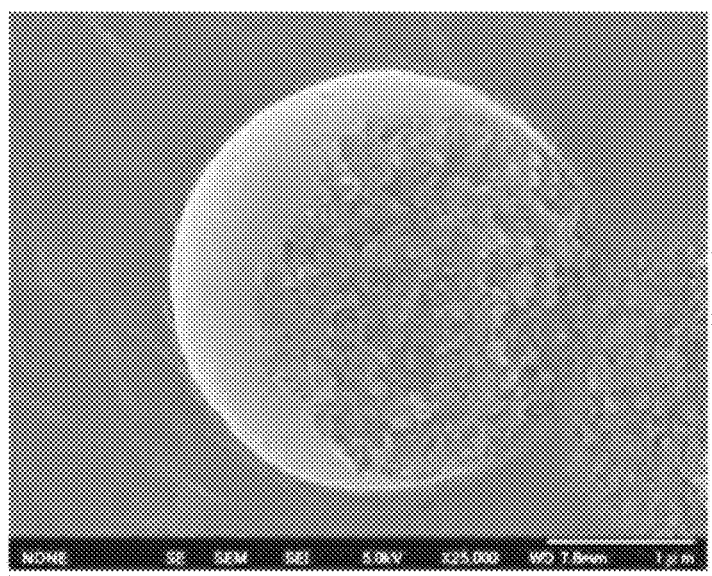
FIG. 2 is a SEM photograph showing a cut surface of a porous resin particle according to an embodiment of the present invention.

When the obtained porous resin particle [1] was observed as it is by a scanning electron microscope (SEM), the porous resin particle [1] having an outer shell portion was confirmed. This is shown in a SEM photograph of FIG. 1. Furthermore, a SEM photograph of the cracked porous resin particle is shown in FIG. 2.

Figure 3:
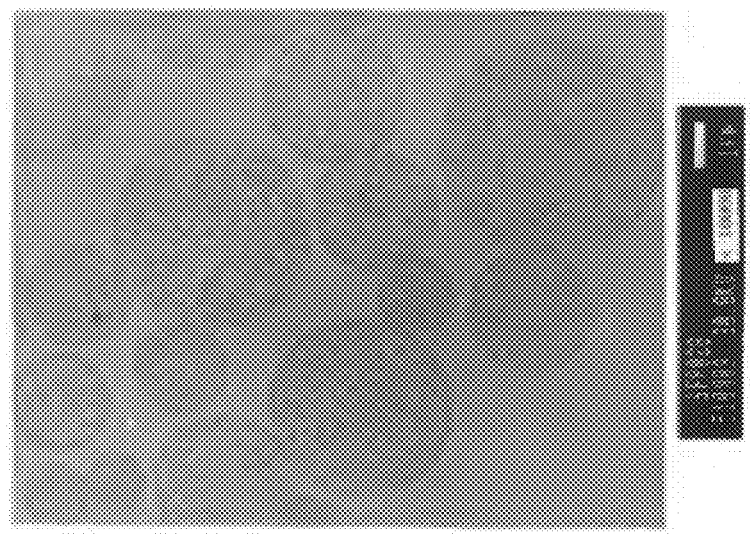
FIG. 3 is a TEM photograph showing a cross section of a porous resin particle according to an embodiment of the present invention.

Furthermore, as to the obtained porous resin particle, when an ultrathin section having a thickness of 50 nm, which was cut out by an ultramicrotome from the sample embedded in a photocurable resin, was observed with a transmission electron microscope (TEM), it was confirmed that the porous resin particle has mesopores each having a void inside, and the content ratio of mesopores is 50% by number or more. That is, it was found that the porous resin particle [1] has a mesoporous structure together with 30% by volume or more of the hollowness. A TEM photograph of the porous resin particle [1] is shown in FIG. 3.

Production Example 2 of Porous Resin Particle

A white porous resin particle [2] was obtained in a similar manner to Production Example 1 of porous resin particle except that the use amount of styrene was changed to 41 parts by mass, and the use amount of divinylbenzene was changed to 16 parts by mass.

When the volume median diameter and hollowness of the porous resin particle [2] were measured in a similar manner to the porous resin particle [1], the volume median diameter was 2.03 μm, and the hollowness was 45% by volume.

Furthermore, when the porous resin particle [2] was observed by a scanning electron microscope (SEM) and a transmission electron microscope (TEM) in a similar manner to the porous resin particle [1], it was confirmed that the porous resin particle [2] has an outer shell portion and mesopores each having a void inside, and the content ratio of mesopores is 50% by number or more. That is, it was found that the porous resin particle [2] has a mesoporous structure together with 30% by volume or more of the hollowness.

Example 1: Production Example 1 of Structure

Eleven parts by mass of the porous resin particle [1] prepared by Production Example 1 of porous resin particle was added into 8 parts by mass of a binder resin, urethane emulsion "WBR-016U" (manufactured by Taisei Fine Chemical Co., Ltd.), and further 2 parts by mass of pure water was added, and then the resultant mixture was dispersed by a rotation and revolution type mixer "ARE-310" (manufactured by THINKY CORPORATION). The obtained dispersion was blade-coated on a glass plate and dried, and a white coating film [1] having a thickness of 30 μm was prepared.

As to the coating film [1], when a part and another part of the coating film [1] were polished by a #4000 wrapping film sheet (manufactured by 3M Company) and a #600 wrapping film sheet (manufactured by 3M Company), respectively while applying a pressure of 40 g per square centimeter, white powder was stuck onto all of the polished wrapping film sheets.

The pure water contact angle (5-point average) of the coating film [1] was measured (a) before polishing (in the initial stage), (b) after shallow polishing 80 times by #4000 (wrapping film sheet was replaced every 40 times), (c) after polishing 40 times by #600, and then deep polishing 40 times by #4000, by using "PCA-1" (manufactured by Kyowa Interface Science Co., Ltd.). The results are shown in Table 1. Furthermore, the measurement after the deep polishing was not performed because water was not stuck. The above-described device has measurement results up to 140 degrees; therefore, description of "140 degrees or more" was used in Table 1.

Figure 4:
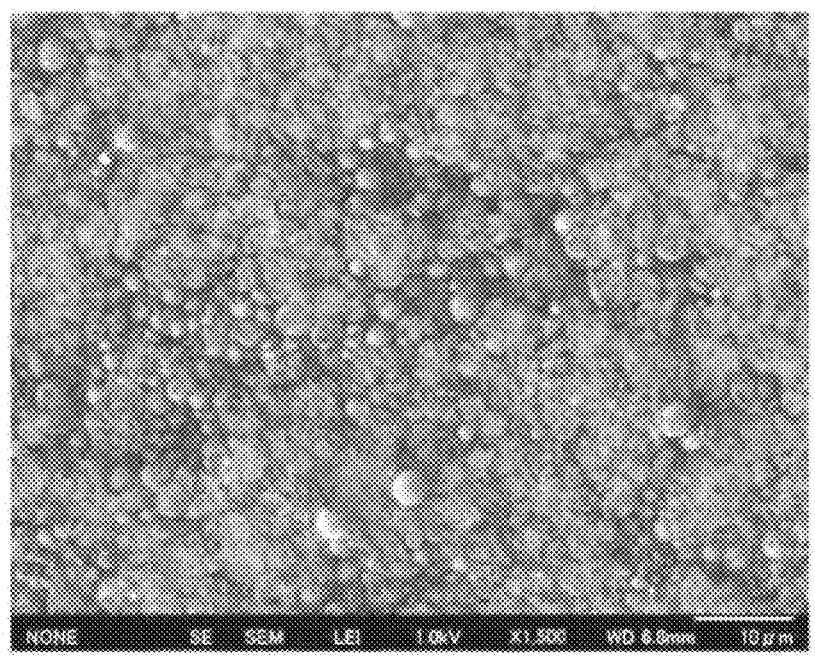
FIG. 4 is a SEM photograph showing a shaved surface of a structure relating to Example 1.

Furthermore, when the surface after the shallow polishing was observed by the SEM, it was confirmed that the inside of the porous resin particle was exposed. This is shown in a SEM photograph of FIG. 4.

Example 2: Production Example 2 of Structure

Example 1

A white coating film [2] was prepared in a similar manner to Production Example 1 of structure except that the porous resin particle [2] was used in place of the porous resin particle [1].

The contact angle of the coating film [2] was measured in a similar manner to the coating film [1]. The results are shown in Table 1.

Comparative Example 1: Production Example 3 of Structure

A urethane emulsion "WBR-016U" (manufactured by Taisei Fine Chemical Co., Ltd.) was blade-coated on a glass plate and heat-dried, and a coating film [3] having a thickness of 30 μm was prepared for comparison.

The contact angle of the coating film [3] was measured in a similar manner to the coating film [1]. The results are shown in Table 1.

TABLE 1

| | Porous | | Contact angle | | |
|---|---|---|---|---|---|
| Coating film No. | resin Particle No. | Binder resin | Initial stage | After shallow polishing | After deep polishing |
| Example 1 | [1] | [1] | WBR-016U | 114 degrees | 133 degrees | 140 degrees or more |
| Example 2 | [2] | [2] | WBR-016U | 85 degrees | 116 degrees | 129 degrees |
| Comparative Example 1 | [3] | [3] | WBR-016U | 80 degrees | 80 degrees | 80 degrees |

Although the present invention has been described and illustrated in detail, it is clearly understood that the same is by way of illustrated and example only and is not to be taken byway of limitation, the scope of the present invention being interpreted by terms of the appended claims.

What is claimed is:

1. A method for producing a porous resin particle comprising an outer shell portion which is exposed on a surface of the porous resin particle, a resin wall portion which is not exposed on the surface of the porous resin particle, a plurality of mesopores surrounded by the outer shell portion and the resin wall portion, and a mesoporous structure portion comprising the plurality of mesopores and the resin wall portion, the method comprising:
    forming an oil-phase liquid by dissolving or dispersing, in a hydrophobic solvent, a polymerizable monomer and an oil-soluble polymerization initiator having a polymerization initiating ability to the polymerizable monomer;
    adding the oil-phase liquid to an aqueous medium consisting of a water-soluble polymerization initiator having a polymerization initiating ability to the polymerizable monomer, water, optionally a water-soluble organic solvent, and optionally a surfactant or a substance having a protective colloid performance;
    forming oil droplets by dispersing the oil-phase liquid in the aqueous medium; and
    forming the outer shell portion and the resin wall portion of the porous resin particle and generating the mesopores inside the porous resin particle by polymerizing the polymerizable monomer by acting the oil-soluble polymerization initiator and the water-soluble polymerization initiator at the same time on the polymerizable monomer,
    wherein a mass ratio of the oil-soluble polymerization initiator the water-soluble polymerization initiator is in a range of 1:1 to 5:1, and
    wherein the polymerizable monomer has a fluorinated alkyl group.

2. The method according to claim 1, wherein the aqueous medium consists of the water-soluble polymerization initiator, the water, and optionally the water-soluble organic solvent.

3. The method according to claim 1, wherein the aqueous medium consists of the water-soluble polymerization initiator and the water.

4. A method for producing a porous resin particle comprising an outer shell portion which is exposed on a surface of the porous resin particle, a resin wall portion which is not exposed on the surface of the porous resin particle, a plurality of mesopores surrounded by the outer shell portion and the resin wall portion, and a mesoporous structure portion comprising the plurality of mesopores and the resin wall portion, the method comprising:

forming an oil-phase liquid by dissolving or dispersing, in a hydrophobic solvent, a polymerizable monomer and an oil-soluble polymerization initiator having a polymerization initiating ability to the polymerizable monomer;

adding the oil-phase liquid to an aqueous medium consisting of a water-soluble polymerization initiator having a polymerization initiating ability to the polymerizable monomer, water, optionally a water-soluble organic solvent;

forming oil droplets by dispersing the oil-phase liquid in the aqueous medium; and forming the outer shell portion and the resin wall portion of the porous resin particle and generating the mesopores inside the porous resin particle by polymerizing the polymerizable monomer by acting the oil-soluble polymerization initiator and the water-soluble polymerization initiator at the same time on the polymerizable monomer, wherein a mass ratio of the oil-soluble polymerization initiator:the water-soluble polymerization initiator is in a range of 1:1 to 5:1.

* * * * *